United States Patent [19]

Schaefer

[11] 3,998,420
[45] Dec. 21, 1976

[54] GUIDE RAIL ARRANGEMENT FOR VEHICLE SEATS

[75] Inventor: Josef Schaefer, Solingen, Germany
[73] Assignee: Bremshey AG., Solingen, Germany
[22] Filed: Feb. 10, 1975
[21] Appl. No.: 548,793

[30] Foreign Application Priority Data

Feb. 13, 1974  Germany ........................ 2406685

[52] U.S. Cl. ............................. 248/429; 308/3.6
[51] Int. Cl.² ...................................... F16M 13/00
[58] Field of Search .......... 248/419, 420, 429, 430;
292/37, 140, 170; 296/65 R; 308/3 R, 3.6, 3.8, 6 R

[56] References Cited

UNITED STATES PATENTS

| 405,784 | 6/1889 | Livingstone | 292/37 UX |
| 941,689 | 11/1909 | Potts | 292/140 |
| 1,019,282 | 3/1912 | Strouse et al. | 292/140 |
| 3,759,587 | 9/1973 | Christin | 308/6 R |

FOREIGN PATENTS OR APPLICATIONS

| 444,752 | 3/1936 | United Kingdom | 248/429 |
| 425,263 | 3/1935 | United Kingdom | 292/37 |
| 18,892 | 11/1891 | United Kingdom | 248/430 |
| 648,183 | 1/1951 | United Kingdom | 248/429 |
| 15,975 | 7/1895 | United Kingdom | 248/429 |

*Primary Examiner*—Lawrence J. Staab

[57] ABSTRACT

An improved guide rail arrangement especially adaptable for vehicle power seats includes a pair of interleavable guide rail assemblies that are individually bolted to the vehicle seat and to the vehicle floor. The fixed guide rail assembly includes a C-shaped member extending upwardly into a guiding space that is formed between the parallel, downwardly projecting legs of a pair of U-shaped rail elements forming the movable rail assembly. A plurality of spaced, horizontally disposed alignable apertures are respectively incorporated in adjacent legs on one transverse side of the interleaved guide rail assemblies. Horizontal movement of the movable rail assembly with respect to the stationary assembly is stopped in a novel way by incorporating a pair of blocking plates symmetrically supported on transversely opposite sides of the longitudinal axis of rail movement. Each blocking element has at least one outwardly directed projection which is normally seated in an aperture in the leg of the inner rail element of the movable guide rail assembly, and is movable transversely outward through the apertures in the legs of the remaining guide rail elements when aligned to lock the vehicle seat with respect to the floor. Such movement is effected by means of a camming arrangement including a longitudinally positionable plate mounted adjacent the blocking plates in the interior of the inner rail element.

7 Claims, 4 Drawing Figures

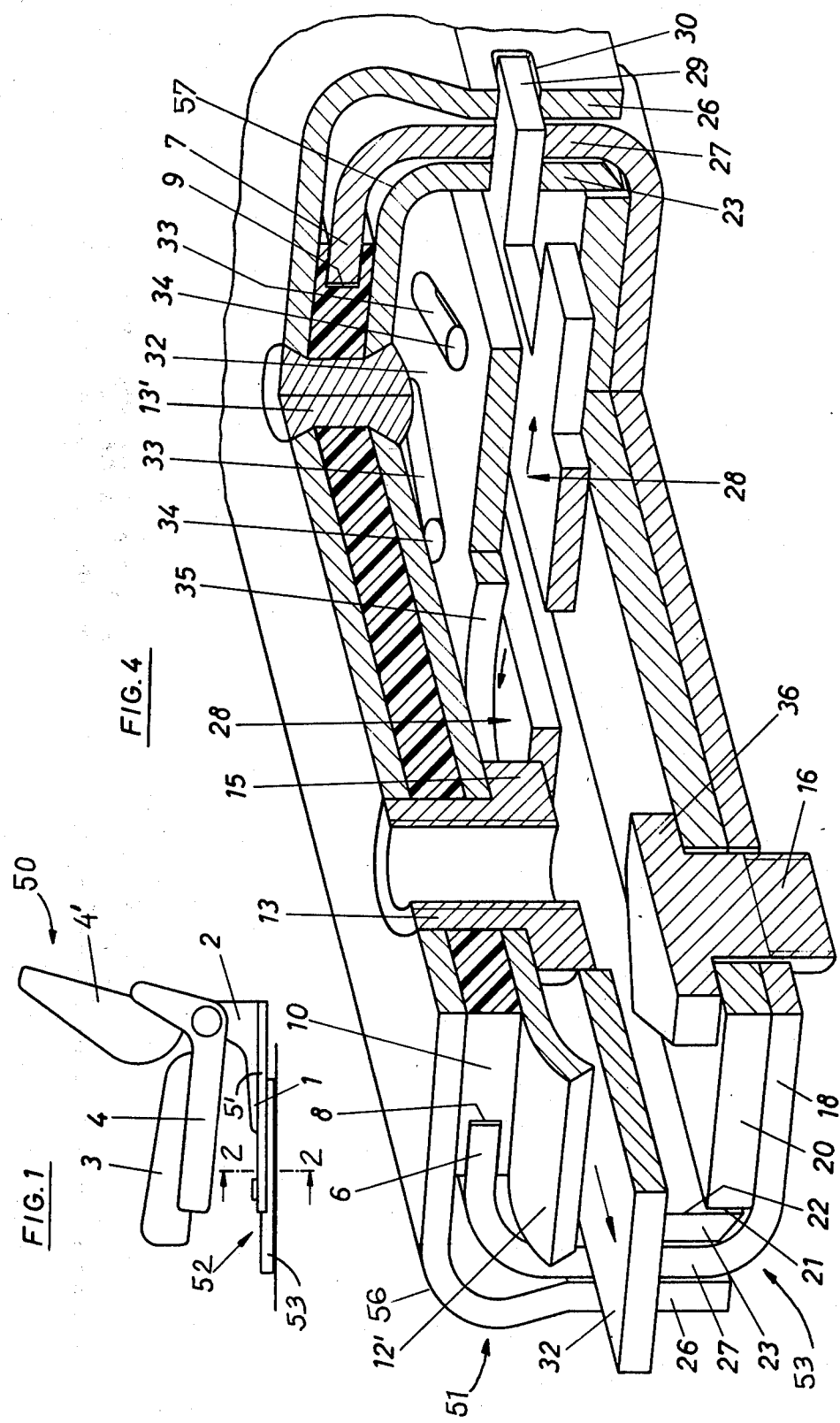

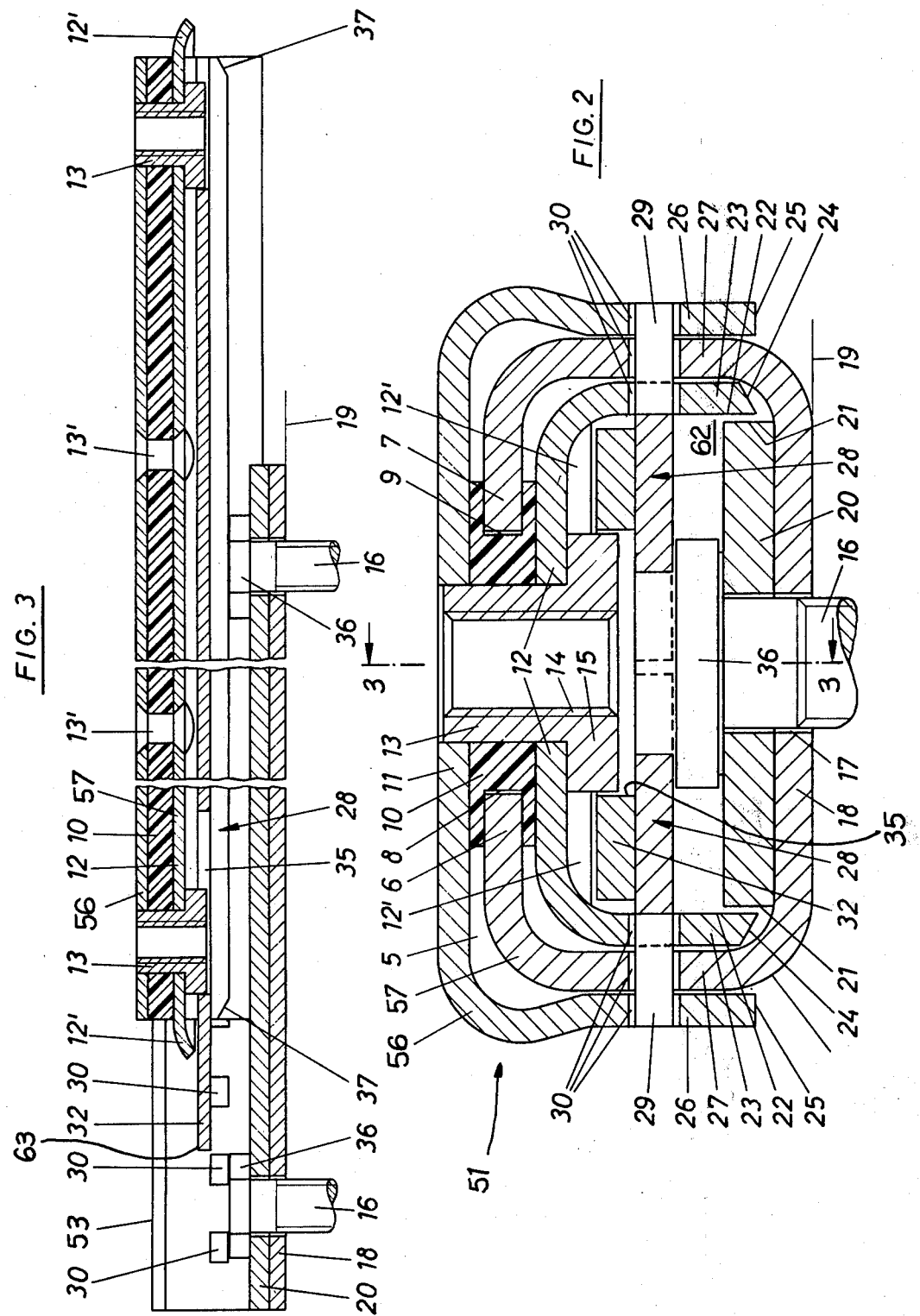

GUIDE RAIL ARRANGEMENT FOR VEHICLE SEATS

BACKGROUND OF THE INVENTION

The present invention relates to guide rail assemblies for effecting limited displacement of a vehicle seat in a longitudinal direction within the vehicle. Commonly known assemblies of this type include first and second interleavable guide rail means which are individually bolted to the vehicle seat and to the vehicle floor, respectively. In such designs, a plurality of aligned apertured regions are provided in adjacent transverse walls of the interleaved guide rail elements. In one known design of this type, exemplified in U.S. Pat. No. 3,790,234, a blocking arrangement disposed outside the guide rail assemblies is mounted for transverse movement inwardly toward the apertured regions in the interleaved guide rail elements to selectively lock the first and second guide rail means against relative movement when the apertures are aligned. In such designs, the movable guide rail portions may include a hollow, substantially closed profile surrounded by a substantially U-shaped fixed rail element, such closed profile being far better to absorb the increased loads characteristic of modern, power vehicle seat applications than previous designs.

The disadvantages of known assemblies of this type include their relative bulkiness, caused principally by the necessity of providing space for the mounting and movement of the external blocking member. Additionally, since such external member lies relatively unprotected within the vehicle, the operation of the guide rail assembly and particularly its latching in a desired position of the seat is subject to contamination by dirt and to mechanical malfunction.

SUMMARY OF THE INVENTION

These and other disadvantages of existing guide rail assemblies of this type are obviated by the improved arrangement of the present invention. In an illustrative embodiment, in which the seat-carrying movable rail element includes inner and outer, downwardly opening U-shaped rail elements, the interior of the inner rail element is designed to receive a rail blocking arrangement that includes a pair of plates having outwardly directed transverse projections, the plates being disposed on transversely opposite sides of the longitudinal axis of movement of the rail assembly.

Such blocking elements are adapted to be movable transversely outward through aligned apertures in corresponding depending legs of the inner and outer rail elements of the movable rail assembly and a cooperating, upwardly extending C-shaped rail element that is secured to the vehicle floor and on which the movable rail element is guided.

The required transverse movement of the blocking plates is effected by means of a camming assembly that includes an additional, longitudinally movable apertured plate disposed adjacent the blocking plates within the interior of the inner rail member. The apertures in the additional plate are disposed at an acute angle to the longitudinal axis of movement of the rail assembly, and cooperate with bosses projecting through the slots from the adjacent surface of each of the blocking plates so that longitudinal reciprocation of the additional plate effects a corresponding reciprocating transverse movement of the blocking plates between an inner rest position and an outer rail-blocking position.

With such arrangement, the critical rail blocking assemblies are fully protected from the exterior environment and are much less subject to contamination and malfunction than previous arrangements.

BRIEF DESCRIPTION OF THE DRAWING

The invention is further set forth in the following detailed description taken in conjunction with the appended drawing, in which:

FIG. 1 is a side view, in elevation, of a vehicle seat guide rail arrangement having respective fixed and movable portions associated with the vehicle floor and vehicle seat, respectively;

FIG. 2 is a sectional view taken along line 2—2 of FIG. 1;

FIG. 3 is a longitudinal view, in section, taken along line 3—3 of FIG. 2; and

FIG. 4 is a perspective view, partially cut away and partially in section, of the guide rail arrangement of FIGS. 1-3, illustrating particularly a preferred construction of a rail-blocking arrangement in accordance with the invention.

DETAILED DESCRIPTION

Referring now to the drawing, a conventional power seat represented generally at 50 includes a substantially L-shaped seat frame 2 which supports at its upper end a seat carrier 4. A back rest cushion 4' is associated with the rear portion of the carrier 4, while a seat cushion 3 is disposed on a horizontal front surface thereof. Suitable mechanisms (not shown) can be provided for (a) adjusting the height of the carrier 4 with respect to the frame 2, (b) adjusting the position of the back rest cushion 4' with respect to the carrier 4, and (c) adjusting the position of the cushion 3 with respect to the carrier 4.

The seat frame 2 is suitably secured as by threaded members 13—13 (FIGS. 2-4) to a movable rail portion 51 of a guide rail assembly 52. The movable portion 51 is supported, in the manner indicated below, for longitudinal movement with respect to a fixed guiding portion 53 of the assembly 52. Such fixed assembly 53 is suitably secured to the vehicle floor by bolts 16—16 (FIGS. 3 and 4).

As shown best in FIGS. 2 and 4, the movable guide rail assembly 51 includes an outer U-shaped rail element 56 having an upper cross-piece 11 and a pair of opposed, downwardly directed legs 26—26. The legs 26 each include a plurality of horizontally spaced apertures 30—30 which are aligned with similar apertures in downwardly depending legs 23—23 of an inner U-shaped rail element 57 of the movable assembly 51. The inner element 57 corresponds essentially in shape to the outer element 56, and has a cross-piece 12 disposed in parallel spaced relation to and within the cross-piece 11 of the element 56, the legs 23 being likewise parallel to and disposed within the respective legs 26 of the element 51. The spacing between the correspondingly shaped inner and outer elements 56 and 57 defines a guide region 5 (FIG. 2), which receives the fixed rail element 53 in interleaved relation with the inner and outer elements 56 and 57.

In particular, the fixed element 53 has a C-shaped cross-section that includes a lower cross-piece 18 which may be situated on the vehicle floor, a pair of parallel legs 27—27 which extend upwardly between and parallel to the downwardly depending legs 26 and 23 of the elements 56 and 57, respectively, and a pair of substantially horizontal cross-pieces 6—6 which bend inwardly and parallel to the cross-pieces 11 and 12 of the members 56 and 57. Each of the legs 27 includes a plurality of horizontally spaced apertures 30 which are alignable with corresponding ones of the apertures in the legs 26 and 23 upon an appropriate positioning of the movable rail assembly 51.

In order to support the movable assembly 51 for reciprocation with respect to the fixed assembly 53, a guide block 10 is affixed to each of the cross-pieces 11 and 12 of the movable elements 56 and 57 in the guiding space 5. Such guide block 10, which also serves as an effective spacer for maintaining the guide space 5, has a pair of inwardly extending transverse slots 61—61 on opposite transverse sides of the longitudinal axis of the guide rail assembly for slidably receiving the inwardly bending upper cross-pieces 6—6 of the fixed rail assembly 53.

A plurality of horizontally spaced rivets 13'—13' (FIG. 3) extend through the cross-pieces 11 and 12 to rigidly tie the various components of the movable rail assembly 51 to each other.

The threaded members 13 that secure the movable assembly 51 to the seat frame 52 respectively extend upwardly successively through apertures in the cross-piece 12, the guide block 10, and the cross-piece 11, the upper portion of the member 13 terminating below the upper surface of such cross-piece 11. The lower surface of the cross-piece 12 is engaged on a radially extending lower flange or shoulder 15 of the threaded member 13. Each such flange 15 extends downwardly into a corresponding one of a plurality of apertures 35—35 in a plate 32 which is supported within the interior of the inner guide rail member 57 of the assembly 51, such center plate 32 functioning as a blocking control element as described below.

The interleaved nature of the various elements 53, 56 and 57 define an essentially closed chamber 62 within such interior of the member 57, thereby assuring complete environmental protection for the plate 32 and for the remaining adjacent elements to be described.

The lower cross-piece 18 of the fixed element 53 is stiffened and reinforced by an additional plate 20. The abovementioned bolts 16—16 for securing the fixed rail assembly to the vehicle floor extend through the elements 20 and 18, with the bolt heads 36 resting on the upper surface of the stiffening element 20.

Disposed parallel to and below the plate 32 in the protected interior space 62 within the inner rail element 57 are a pair of blocking plates 28—28 respectively supported for transverse movement on opposite sides of the longitudinal axis of the rail assembly. Each of the blocking plates 28 are provided with at least one and preferably, as illustrated, a plurality of outwardly extending projections 29—29 which are receivable in aligned ones of the apertures 30—30 in the legs 26, 27 and 23 in the manner shown best in FIG. 2. For this purpose, the respective plates 28 are supported for transverse movement between an inner rest position, where the projections 29 illustratively extend only into the apertures 30 of the inner rail element 57 as shown in dotted lines in FIG. 2, and an outer position shown in solid lines in such FIG. 2.

In such outer position, the blocking plates 28 extend through all the apertures 30 in the legs 26, 27 and 23 when the movable rail assembly 51 is suitably positioned longitudinally with respect to the fixed assembly 53, thereby preventing further movement of the vehicle seat with respect to the vehicle floor.

In order to position the symmetrically disposed blocking plates 28 in a desired one of their inner and outer positions, the above-mentioned plate 32 is associated with the plates 28 by means of a suitable camming assembly. In particular, the plate 32, which is supported for longitudinal movement within the interior of the inner guide rail member 57, is provided with at least one pair of oblique slots 33—33 which are positioned on transversely opposite sides of the longitudinal axis. The slots 33 define equal acute angles with respect to the longitudinal axis, and are so positioned with respect to the underlying parallel blocking plates 28 as to suitably receive projections 34—34 extending upwardly from the top surfaces of such plates 28. With this arrangement, a longitudinal movement of the plate 32 will cam the oppositely disposed projections 34, and thereby the respective plates 28, in opposite transverse directions as the plate 32 is longitudinally moved.

The clearance between the apertures 35 and the surrounded outer surface of the flanges 15 of the threaded members 13 is preferably chosen to correspond substantially to the component of the oblique slots 33 in the longitudinal direction, thereby providing adequate space for longitudinal movement of the plate 32. It will be understood that a suitable handle or lever, accessible to a seat occupant, can be associated with a forwardly projecting end 63 of the plate 32 to control the longitudinal movement of such plate 32 and thereby the locking movements of the blocking plates 28. If spring-loaded levers are provided for this purpose, the lever springs may be suitably situated within the interior protected space 62 of the inner guide rail member 57.

For added protection, the forward and rearward longitudinal ends (designated 12') of the cross-piece 12 of the inner rail member 57 are bent downwardly to terminate adjacent the top surface of the blocking control plate 32, thereby minimizing the possibility of contamination entering the protected space 62 through which the plate 32 slides.

In the foregoing, the invention has been described in connection with an illustrative embodiment thereof. Many variations and modifications will now occur to those skilled in the art. It is accordingly desired that the scope of the appended claims not be limited to the specific disclosure herein contained.

What is claimed is:

1. In an apparatus for effecting limited displacement of a vehicle seat in a longitudinal direction within the vehicle, comprising first and second interleavable hollow guide rail means individually associated with the vehicle seat and with the vehicle, respectively, the first guide rail means comprising a first downwardly opening U-shaped rail element having a cross-piece and a pair of opposed, side wall-defining legs, the second guide rail means comprising a second rail element having a top surface and a pair of side wall defining legs individually extending adjacent the legs of the fixed guide rail elements, the first and second guide rail means having alignable apertured regions in a pair of adjacent side walls thereof, means mounting the first guide rail element for longitudinal movement with respect to the second guide rail elememt, and means movable transversely to the apertured regions for selectively locking the first and second guide rail elements against relative movement when such regions are aligned, the improvement wherein the top surface of the fixed rail element extends inwardly from the side walls thereof to define a self-contained, essentially hollow interior of the fixed rail element; wherein the legs of the movable rail element individually extend outwardly of the adjacent side walls of the fixed rail element; wherein the alignable apertured regions in the side walls of the respective rail elements are distributed in transversely aligned relation on opposite transverse sides of the longitudinal axis; and wherein the locking means comprises, in combination, a pair of transversely aligned blocking plates supported within the hollow interior of the fixed rail element for opposite transverse movement between an outer locking position and an inner rest position, each blocking plate having at least one transverse projection extendable outwardly through the apertured regions in the adjacent ones of the fixed and movable rail elements when such plate is in the outer position, blocking control means supported for longitudinal movement within the hollow interior of the fixed rail element, and camming means individually coupling the blocking plates to the blocking control means for transversely moving the blocking plates in opposite transverse directions between their inner and outer positions, respectively, upon a reciprocation of the blocking control means in the longitudinal direction.

2. In an apparatus for effecting limited displacement of a vehicle seat in a longitudinal direction within the vehicle, comprising first and second interleavable hollow guide rail means individually associated with the vehicle seat and with the vehicle, respectively, the first and second guide rail means having alignable apertured regions in adjacent side walls thereof, means mounting the first guide rail means for longitudinal movement with respect to the second guide rail means, and means movable transversely to the apertured regions when such regions are aligned to selectively lock the first and second guide rail means against relative movement, the improvement wherein the first guide rail means comprises inner and outer, downwardly opening U-shaped rail elements fixedly supported with their respective cross-pieces and their respective legs disposed in parallel spaced relation to define an intermediate guiding space therebetween; wherein the second guide rail means comprises an additional, upwardly opening C-shaped rail element supported within the intermediate guiding space of the guide rail means; in which the means mounting the first guide rail means for longitudinal movement comprises a guide block secured to the cross-pieces of the inner and outer rail elements and disposed in the intermediate guiding space, the guide block having oppositely disposed transverse slots for individually receiving the respective upper cross-pieces of the C-shaped rail element; in which the locking means comprises, in combination, at least one first blocking plate supported within the hollow interior of the inner rail element for transverse movement between an outer locking position and an inner rest position, the blocking plate having at least one outwardly directed transverse projection extendable through the aligned apertured regions in the inner and outer rail elements and in the C-shaped rail element when such first plate is in the outer position, a second plate disposed substantially parallel to the first plate and supported for longitudinal movement within the hollow interior of the inner rail element, means defining at least one slot through the second plate, each slot extending at an acute angle to the longitudinal axis, and a rod individual to each slot extending from each first plate through the corresponding slot in the second plate for transversely moving the first plate between its inner and outer positions upon a reciprocation of the second plate in the longitudinal direction.

3. Apparatus as defined in claim 2, further comprising a support plate overlying the inner surface of the lower cross-piece of the C-shaped rail element, the support plate having a transverse extent that terminates adjacent the respective opposed, downwardly extending legs of the inner rail element of the first guide rail means.

4. Apparatus as defined in claim 2, further comprising means including a threaded socket member extending upwardly through the spaced cross-pieces of the inner and outer rail elements and the guide block for securing the first guide rail means to the vehicle seat.

5. Apparatus as defined in claim 4, in which the threaded socket member has an enlarged flange on its lower end, and in which the second plate has an apertured region for receiving the enlarged flange, the clearance between the enlarged flange and the periphery of the apertured region in the second plate corresponding substantially to the component of the oblique slot in the second plate lying in the longitudinal direction.

6. Apparatus as defined in claim 2, in which the interconnected inner and outer rail elements of the first guide rail means each has a plurality of spaced, horizontally aligned apertures in at least one corresponding pair of their respective parallel, downwardly extending legs for selectively receiving the transverse projections of the associated first plate when the latter is in its outer position; and in which the corresponding leg of the C-shaped rail element has a plurality of corresponding apertures alignable with the apertures in the surrounding legs of the inner and outer rail elements.

7. Apparatus as defined in claim 6, in which the first plate is supported with its transverse projection situated in an aperture in the leg of the inner rail element when the first plate is in its inner rest position.

* * * * *